United States Patent [19]

Lawson

[11] 4,123,488

[45] Oct. 31, 1978

[54] MOLDED PLASTIC ARTICLE AND METHOD OF MAKING THE SAME

[76] Inventor: David E. Lawson, 701 Riford Rd., Glen Ellyn, Ill. 60137

[21] Appl. No.: 830,873

[22] Filed: Sep. 6, 1977

[51] Int. Cl.² .......................... B29C 5/00; B29D 3/02; B29F 1/00
[52] U.S. Cl. ..................................... 264/135; 264/137; 264/250; 264/255; 264/257; 264/265; 264/328
[58] Field of Search ............... 264/129, 134, 137, 257, 264/258, 265, 266, 255, 250, 328, 329, 338, 135

[56] References Cited

U.S. PATENT DOCUMENTS

| | | | |
|---|---|---|---|
| 2,802,766 | 8/1957 | Leverenz | 264/255 |
| 3,058,165 | 10/1962 | Purvis | 264/257 |
| 3,250,640 | 5/1966 | Varlet | 264/134 |
| 3,971,837 | 7/1966 | Hasegawa | 264/255 |

*Primary Examiner*—Willard E. Hoag
*Attorney, Agent, or Firm*—Andrus, Sceales, Starke & Sawall

[57] ABSTRACT

A composite molded article composed of a backing layer of fiber-reinforced thermosetting resin and an outer layer of a thermoplastic resin which is mechanically interlocked to the backing layer through the fiber reinforcement. In fabrication, a layer of fibrous material impregnated with an uncured thermosetting resin is placed in a mold and a molten thermoplastic resin is injected into the mold. The heat of the thermoplastic resin serves to cure the thermosetting resin and the resulting composite article has a rigid, high strength backing formed of the reinforced thermosetting resin and has a smooth thermoplastic outer surface which is receptive to surface finishes.

11 Claims, 3 Drawing Figures

MOLDED PLASTIC ARTICLE AND METHOD OF MAKING THE SAME

BACKGROUND OF THE INVENTION

Recently there has been increased usage of fiber reinforced theremosetting resins for vehicle body parts. The general practice is to mold the body parts through use of a sheet molding compound (SMC) or a bulk molding compound (BMC). The SMC is a sheet composed of fibrous material, such as glass fiber matt or woven glass fabric, impregnated with an uncured or partially cured thermosetting resin system, such as a polyester resin system. At the time of use the SMC is cut to the desired size, placed in the mold and through the application of pressure and heat, the resin system is cured to form the article.

With the BMC, the glass fibers are in a chopped form and are mixed in bulk with the uncured resin system. At the time of use, a batch of the BMC is placed in the mold and through the application of heat and pressure the resin system is fully cured.

A problem inherent with the use of the SMC or BMC is that the molded article contains minute pits or voids due to shrinkage associated with the polymerization of the resin system at the elevated temperature. The pitted nature of the surface presents a problem when the article is to be painted to match other vehicle body components, for the painting accentuates the pitting. Because of this, it has been the practice to fill in the pits with a filler and sand the filled area prior to painting. However, the sanded area has a slightly different coloration after painting, so that it is generally necessary to sand the entire surface prior to painting to provide uniformity. Because of these problems and the hand labor required, vehicle body parts formed from SMC and BMC have been relatively expensive.

It has been recognized that it would be advantageous to apply a layer of a thermoplastic material to the outer surface of a thermosetting resin article in order to provide a smooth outer surface more receptive to painting, and yet achieve the high strength and rigidity associated with the thermosetting resin. However, attempts in the past to provide this type of composite structure has not been successful because an adequate bond has not been obtained between the thermoplastic material and the thermosetting resin base.

SUMMARY OF THE INVENTION

The invention relates to a composite molded article including a structural backing layer formed of fiber reinforced theremosetting resin and an outer skin or layer of thermoplastic resin which is mechanically interlocked to the backing layer through the reinforcement.

To fabricate the composite article, a layer of fibrous material impregnated with an uncured, thermosetting resin system, which can be in the form of SMC or BMC, is placed in a mold which is at ambient temperature. A thermoplastic resin, at a temperature in excess of 250° F, is injected under high pressure into the mold and the heat of the thermoplastic resin serves to cure the thermosetting resin and provide a composite structure in which the thermoplastic layer is impregnated and mechanically interlocked to the cured thermosetting resin through the fiber reinforcement.

The thermosetting resin is preferably a polyester resin, and in formulating the resin system, a monomer is used which has a boiling point above the temperature of the thermoplastic resin being injected into the mold, so that the monomer will not volitalize during the molding operation. Voltilization of the monomer can result in the formation of gas pockets in the molded structure.

The composite article of the invention is formed in a single molded operation without the need of heating the mold, for the heat required to cure the thermosetting resin is supplied through the injected thermoplastic resin. The resulting structure has a fiber reinforced thermosetting resin backing that provides rigidity, stability and mounting capability, while the outer surface or skin is formed of a thermoplastic resin which provides an extremely smooth surface requiring minimum treatment for finishing.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
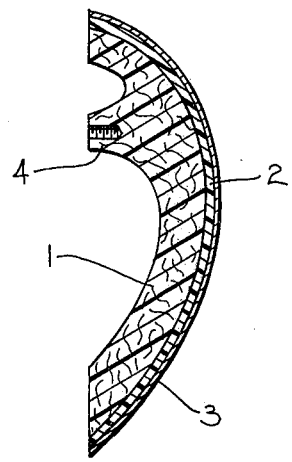
FIG. 1 is a sectional view of a composite structure formed by the method of the invention.

FIG. 1 illustrates a molded composite structure formed by the method of the invention and composed of a fiber reinforced thermosetting resin backing layer 1 and an outer layer 2 formed of a thermoplastic resin which is mechanically bonded or interlocked to the backing layer 1 through the fibrous reinforcement. A decorative or protective coating of paint, lacquer or plated metal 3 can be applied to the outer surface of layer 2. As illustrated in FIG. 1, a threaded boss 4 for attaching a fastener can be integrally molded into the rear surface of the backing layer 1 and provides a means for attaching the structure to a mounting or support.

The thickness of the layers 1 and 2 is not critical and depends primarily on the application or use of the article, as well as its configuration or shape. For use as a vehicle body component, the backing layer 1 may have a thickness generally in the range of about one-fourth inch and the thermoplastic layer can have a thickness in the range of one-sixteenth to one-eighth inch.

Figure 2:
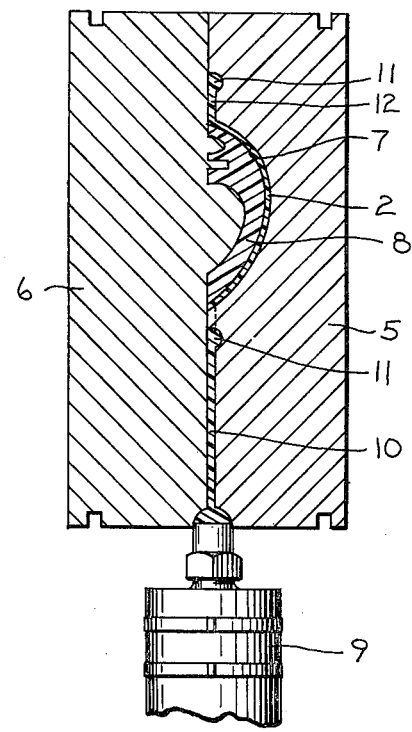
FIG. 2 is a schematic representation of the mold used in forming the composite structure.
Figure 3:
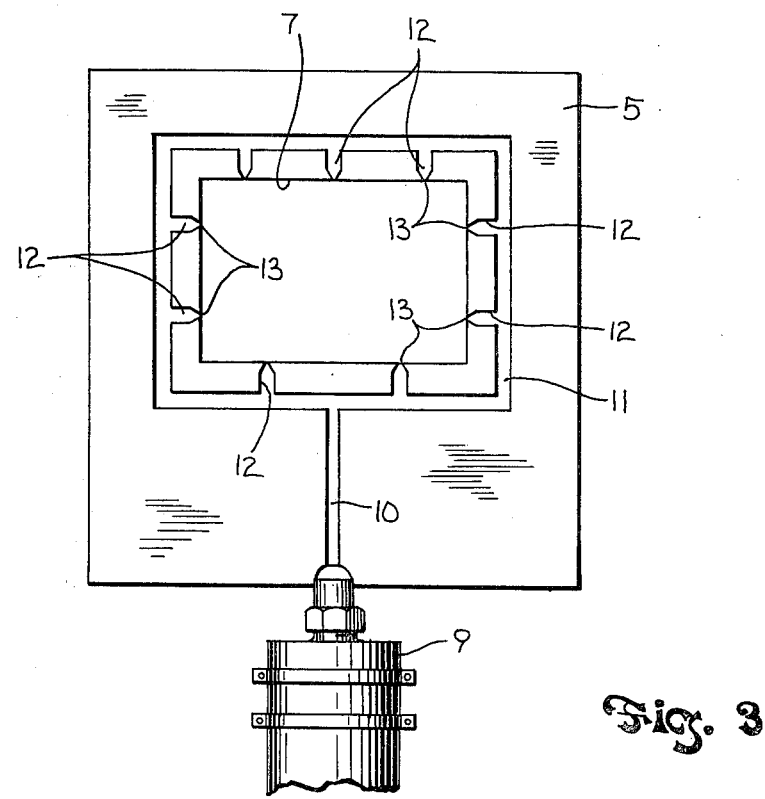
FIG. 3 is a plan view of one of the mold members.

FIGS. 2 and 3 illustrate the method of molding the composite structure. As shown in FIG. 2, the mold is comprised of two sections 5 and 6 and when the mold sections are in the closed or mating position they define a cavity 7.

A fibrous material impregnated with an uncured resin system which can be in the form of SMC or BMC is placed as a layer 8 in the cavity 7. The thickness of the layer 8 is such that it does not completely fill the cavity. The fibrous material in the layer 8 is preferably glass fibers, but can take the form of other fibrous materials, as for example, animal fibers such as wool; vegetable fibers such at cotton; synthetic fibers such as nylon, Dacron, or Orlon; mineral fibers such as asbestos; or metal fibers such as steel. The fibrous material can be in the form of chopped randomly oriented fibers, matt, woven fabric, or the like.

The thermosetting resin is preferably a polyester system, which includes unsaturated anhydrides and dibasic acids, saturated anhydrides and dibasic acids, glycols and monomers. The unsaturated anhydrides and dibasic acids may take the form of maleic anhydride or fumaric acid; the saturated anhydrides and dibasic acids may be compounds such as phthaltic anhydride, isophthalic acid, adipic acid, azelaic acid, sebacic acid, chlorendic acid, tetrabromophthalic acid, hexachloro octahydromethanonaphthalene dicarboxylic acid, nadic methyl anhydride, and the like; the glycols can be propylene glycol, dipropylene glycol, ethylene glycol, diethylene glycol, neopentyl glycol, trimethyl pentanediol, and the like; the monomer is a compound having a boiling point above 250° F such as diallyl phthalate, or divinyl benzene.

In addition the resin system can contain additives such as catalysts, fillers, thickeners, pigments, etc. Organic peroxides, such as tertiary-butyl perbenzoate t-butyl peroxyoctoate or mixtures thereof, can be used in amounts of about 0.3% to 1.5% by weight of the total resin system as catalysts. Calcium carbonate, hydrated alumina, and clay are commonly used as fillers in amounts up to about 20% by weight of the total resin system, while calcium and magnesium oxides can be employed as thickeners in amounts generally up to 3%.

Finely ground thermoplastic resins, such as polyethylene, can also be incorporated in the system, in amounts generally in the range of 2% to 5% of the total resin system to achieve low polymerization shrinkage.

The polyester resin system is a conventional type and a specific example of a polyester formulation which can be used is as follows in parts by weight:

| Phthalic anhydride | 148 |
| Maleic anhydride | 98 |
| Propylene glycol | 164 |
| Diallyl phthalate | 180 |
| Hydroquinone | 0.036 |

Using the above polyester resin, the following overall resin system can be employed in parts by weight:

| Polyester resin | 100 |
| Tertiary-butyl perbenzoate (catalyst) | 1 |
| Zinc stearate (mold release) | 4 |
| Polyethylene powder | 6 |
| Calcium carbonate (fillter) | 150 |
| Magnesium oxide (thickener) | 1 |

The resin of layer 8 is in the partially cured or B stage, and is capable of being polymerized to the fully cured state through the application of heat. In practice, temperatures in the range of 270° F to 330° F are used to cure the resin.

In many conventional polyester resin systems, styrene is used as the monomer. The styrene monomer has a boiling point of about 230° F, and the thermoplastic resin, which is subsequently injected into the mold, is at a temperature generally above 250° F, above the boiling point of styrene. If styrene or other volatile monomers are used, the heat of the thermoplastic resin will vaporize the monomer, resulting in gas pockets or voids in the final structure. Excessive vapor pressure can also cause the molded part to blow apart at the interface of the thermoplastic and thermosetting resins. Consequently, it is important that the components of the resin system, and particularly the monomer, have a boiling point in excess of the temperature of the injected thermoplastic resin, which in normal practice would be a boiling point in excess of 250° F to 300° F.

With the layer 8 of the fibrous material properly positioned in the die cavity, the thermoplastic resin is injected into the cavity by use of a conventional injection molding machine 9. To provide the proper distribution of the thermoplastic material in the mold cavity, a part line runner system is preferably used.

As shown in FIG. 3, the molten thermoplastic resin is injected into a semi-circular groove or runner 10 in mold section 5, and runner 10 communicates with rectangular runner 11 which surrounds the cavity 7. A series of runners 12 are connected to the runner 11 and each runner 12 terminates in a tapered restricted outlet or gate 13 which is located at the interface of the cavity 7. With this runner system, the molten thermoplastic resin will be distributed through gates 13 to various locations within the cavity 7.

The thermoplastic resin can be a material such as nylon, polyurethane, polystyrene, polyvinylchloride, acrylonitrilebutadiene-styrene (ABS), or the like.

The thermoplastic material injected into cavity 7 is normally at a temperature in excess of 250° F and has a pressure in the range of about 10,000 to 20,000 psi.

The heat of the injected thermoplastic resin acts to cure or fully polymerize the thermosetting resin system, while the pressure acts to drive the thermoplastic material into interlocking relation with the fibrous reinforcing material at the interface between the thermosetting resin and the injected thermoplastic resin.

After a period, generally in the range of about 1 to 4 minutes, the mold sections are opened and the completed composite part can be removed from the mold.

To protect the SMC or BMC layer 8 from the fluid surge of the injected thermoplastic resin, a layer of fibrous fabric or matt, such as glass fiber cloth or matt, can be applied to the surface of layer 8 exposed to the injected resin. The protective layer, not shown in the drawings, can be dry or impregnated with an uncured or partially cured thermosetting resin system, preferably the same resin system as used in layer 8. The protective layer will aid in preventing the displacement or disruption of the layer 8 when the thermoplastic resin is injected into the cavity under high pressure and also will function as a locking interface to aid in bonding the layer 8 and the thermoplastic resin.

Alternately, the thermoplastic resin can be introduced into the cavity at low pressure and after the cavity is filled the pressure can be increased to the aforementioned range. This low pressure fill system will also prevent the displacement or disruption of the layer 8 in the mold cavity.

The article of the invention is formed in a single molding operation and provides a composite structure in which the thermoplastic outer layer or skin is firmly bonded or interlocked to the thermosetting resin inner layer. The fiber reinforced thermosetting resin provides rigidity, stability and moiunting capability, while the outer thermoplastic layer provides an extremely smooth surface that requires minimum preliminary treatment prior to painting, metal plating, or other finishing.

Various modes of carrying out the invention are contemplated as being within the scope of the following claims particularly pointing out and distinctly claiming the subject matter which is regarded as the invention.

I claim:

1. A method of making a molded composite structure, comprising the steps of placing in a mold cavity a fibrous material impregnated with an uncured thermosetting resin system capable of being cured by the application of heat, and injecting a molten thermoplastic resin into the mold cavity under pressure and at a temperature above the temperature required to cure the thermosetting resin system, the sensible heat of the thermoplastic resin providing heat required to cause the thermosetting resin system to cure to provide a composite structure having a cured thermosetting resin backing layer and a smooth thermoplastic resin outer surface bonded to the backing layer.

2. The method of claim 1, wherein the thermoplastic resin is at a pressure above 10,000 psi.

3. The method of claim 1, wherein the step of injecting the resin comprises introducing the molten thermoplastic resin into the mold cavity under a first pressure sufficiently low to prevent disruption of the fibrous material to fill the cavity, and thereafter applying a second pressure to the molten thermoplastic resin, said second pressure being substantially greater than the first pressure.

4. The method of claim 1, wherein the fibrous material comprises a plurality of randomly arranged fibers, and said method includes the step of applying a layer of woven cloth on the exposed surface of the fibrous material prior to injecting the thermoplastic resin into said cavity, said layer serving to protect the fibrous material from the fluid surge of the thermoplastic resin being injected into said cavity and preventing disruption of the fibrous material.

5. The method of claim 1, wherein said thermosetting resin system is a polyester resin system including a monomer having a boiling point above the temperature of the thermoplastic resin being injected into said mold.

6. The method of claim 2, wherein said monomer has a boiling point above 250° F.

7. The method of claim 2, wherein said monomer is selected from the group consisting of diallyl phthalate and divinyl benzene.

8. A method of making a composite structure, comprising the steps of placing in a mold cavity a mass of fibrous material impregnated with an uncured polyester resin system capable of being fully cured by the application of heat, said mass being spaced from a wall of said cavity to produce a space, injecting a heated molten thermoplastic resin into the space in the mold cavity and into contact with said mass, maintaining the temperature of the molten thermoplastic resin at a value below the volatilizing temperature of the components of the resin system, the heated thermoplastic resin being the sole source of heat to effect curing of the polyester resin system and provide a composite structure having a rigid polyester resin backing member and a smooth thermoplastic outer layer, and removing the composite structure from the mold cavity.

9. The method of claim 8, wherein said fibrous material comprises glass fibers and said monomer is selected from the group consisting of diallyl phthalate and divinyl benzene.

10. The method of claim 8, including the step of applying a finish coating to the outer surface of the thermoplastic layer.

11. The method of claim 10, wherein said mass comprises a sheet molding compound.

* * * * *

UNITED STATES PATENT AND TRADEMARK OFFICE
CERTIFICATE OF CORRECTION

PATENT NO. : 4,123,488
DATED : October 31, 1978
INVENTOR(S) : DAVID E. LAWSON

It is certified that error appears in the above–identified patent and that said Letters Patent are hereby corrected as shown below:

Column 6, Line 3, CLAIM 6, Cancel "claim 2" and substitute therefor ---claim 5---, Column 6, Line 5, CLAIM 7, Cancel "claim 2" and substitute therefor ---claim 5---.

Signed and Sealed this

Third Day of April 1979

[SEAL]

Attest:

RUTH C. MASON
Attesting Officer

DONALD W. BANNER
Commissioner of Patents and Trademarks